C. A. SUNDT.
GOVERNOR AND REGULATOR FOR ENGINES, MOTORS, &c.
APPLICATION FILED JULY 18, 1917.

1,265,134.

Patented May 7, 1918.

Inventor
Carlos A. Sundt,
By his Attorneys
Pennie, Davis, Marvin + Edmonds

UNITED STATES PATENT OFFICE.

CARLOS A. SUNDT, OF SANTIAGO, CHILE.

GOVERNOR AND REGULATOR FOR ENGINES, MOTORS, &c.

1,265,134.

Specification of Letters Patent.   Patented May 7, 1918.

Application filed July 16, 1917. Serial No. 181,231.

*To all whom it may concern:*

Be it known that I, CARLOS A. SUNDT, a citizen of the Republic of Chile, residing at Santiago, Chile, have invented certain new and useful Improvements in Governors and Regulators for Engines, Motors, &c.; and I do hereby declare the following to be a full, clear, and exact description of the invention, such as will enable others skilled in the art to which it appertains to make and use the same.

This invention relates to governors for engines and motors of various kinds such as steam or gas engines or hydraulic motors, electric motors, etc.; and more particularly to governors and regulators for such engines and motors which will so govern and regulate the speed thereof that substantially uniform speed will be maintained with varying loads and power requirements.

The invention comprises, in combination, a driving shaft and a driven shaft connected by a flexible or elastic connection for transmitting the power, so that, with variations in the load or the power required, the driving and driven shafts will assume different relative angular positions, together with means operated or acted upon or controlled by such differences in the relative angular positions that the power applied will be governed thereby so that the power will increase and decrease with corresponding increase and decrease of the load, and so that a substantially uniform speed will be maintained with varying loads and power requirements.

The governor or regulator of my invention is applicable to various kinds of engines and motors where energy or power is to be transformed, under a relatively constant speed, into another form of energy or work, through shaft connections. That is to say, the driving engine or motor will be provided with a driving shaft and the driven machine provided with a driven shaft which derives its power from the driving shaft and from the engine or motor which drives this driving shaft.

According to the present invention, the driving and driven shafts are connected through an elastic coupling or connection which enables relative rotation of the driving and driven shafts with respect to each other, this relative rotation increasing and decreasing with increase and decrease of power transmitted from the driving to the driven shaft. This difference in relative rotation or torque, is, according to the present invention, so connected with the driving engine or motor as to govern the driving force thereof so that the driving force or power will be increased and decreased with increase and decrease of load, to the end that a substantially uniform speed of the shafts may take place under varying loads.

It will be evident that various types of flexible connections can be provided, with varying degrees of sensitiveness, so that variations in the power transmitted therethrough will cause either large or small variations in the relative angular positions of the shafts. It will be evident also, that various types of mechanical and electrical connections can be provided which will be acted upon by this difference in the relative positions of the driving and driven shafts, and which will transmit this difference to the driving engine or motor to regulate the same.

The invention will be further described in connection with certain embodiments thereof illustrated in the accompanying drawings, but it will be understood that the invention is illustrated by, but is not limited to, the embodiments thereof as illustrated and described.

Figure 1:
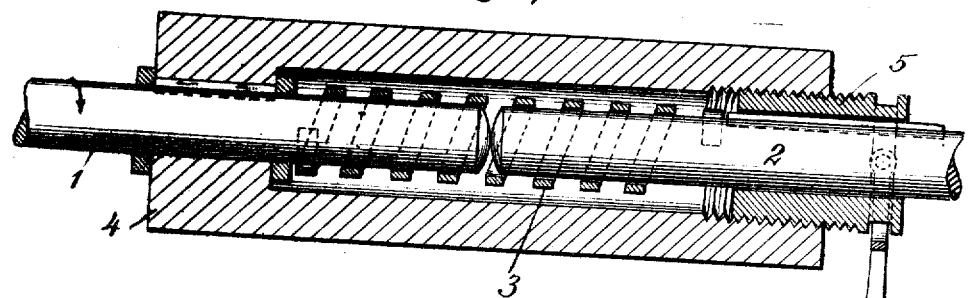
Figure 1 shows a governor or regulator for acting mechanically upon the motor or engine to be regulated or upon the appropriate elements thereof.

In the construction of Fig. 1, the driving shaft 1 and the driven shaft 2, are connected by the flexible connection 3, which is shown as a spiral or helical spring member secured respectively to the driving and driven shafts. Carried by the driving shaft 1 is a sleeve 4 which is keyed to the driving shaft to rotate therewith and which is also prevented from longitudinal movement with respect to the driving shaft. Carried by the driven shaft 2 is a bushing 5 keyed to the shaft so that it will rotate therewith but free the slide longitudinally with respect thereto. The sleeve 4 and bushing 5 are threaded as shown so that relative movement thereof will cause the bushing 5 to be moved longitudinally upon the driven shaft 2. The bushing 5 acts upon one end of a lever 6 pivoted at 7, the end of this lever being suitably connected to the bushing as by means of a circumferential recess or groove in the bushing. The end of the lever 6 is to be connected to the driving machine or engine or motor to regulate the driving force, such as steam, water, etc., in accordance with the well understood principles of governing such engines.

It will be evident that, with increase in load, applied to the driven shaft, this shaft will tend to be retarded in its rotation so that the driving shaft will rotate angularly with respect thereto until the flexible connection assumes a position or condition appropriate to the transmission of the required power therethrough. With increased load upon the driven shaft and with resulting tendency toward decreased speed, an increased amount of power must be applied to the driving shaft to cause the driven shaft to still rotate with uniform speed. The relative rotation of the driven and driving shafts will cause the relative rotation of the sleeve 4 and bushing 5 so that the bushing 5 will slide upon the driven shaft 2 and cause a corresponding movement of the regulating lever 6, by means of which the required control of the driving engine or motor will be effected so that the corresponding increase or decrease in power applied to the driving shaft will make up for the increased load on the driven shaft and still cause the desired speed of rotation thereof.

Figure 2:
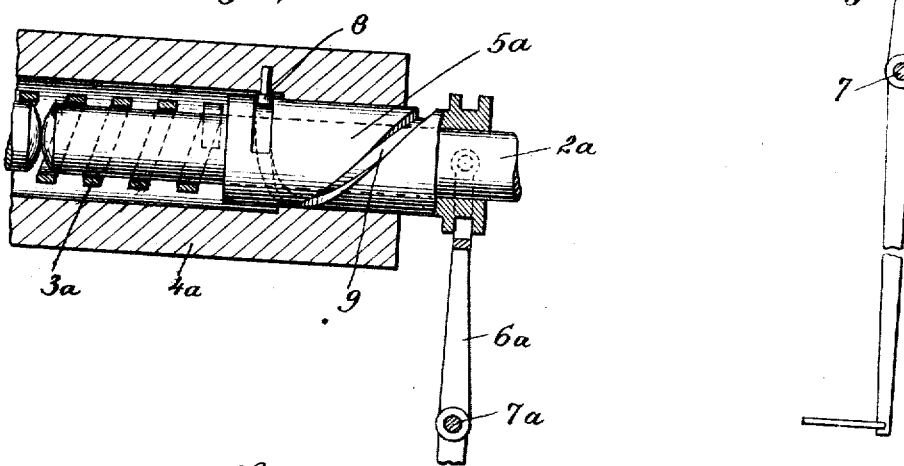
Fig. 2 shows a similar but modified construction.

In Fig. 2, a similar arrangement of the driving and driven shafts is illustrated with a similar flexible coupling or connection. In this construction, however, instead of providing a screw-threaded sleeve and bushing, as in Fig. 1, the sleeve 4ª is provided with a pin 8 which operates in a slot or groove 9, in the bushing 5ª. This slot or groove, instead of being helical and regular, as the screw-thread of Fig. 1, is provided with a relatively slight inclination near the point of normal location of the pin 8, and with a greater inclination at a greater distance from this normal position, as clearly illustrated. The result of this arrangement is to cause but slight longitudinal movement of the sleeve 5ª on the shaft 2, upon slight relative rotation of the driving and driven shafts; and to cause a relatively much greater longitudinal movement of the sleeve or bushing 5ª when a very considerable difference in the relative rotation of the driving and driven shafts takes place. The sleeve or bushing 5ª of Fig. 2, acts upon a lever or operating arms 6ª pivoted at 7ª and the control and regulation therefrom will be effected in the manner above described.

The arrangement of Fig. 2 provides for more quickly and surely governing the driving motor with quick and sudden or extensive variations in the load and power required.

Figure 3:
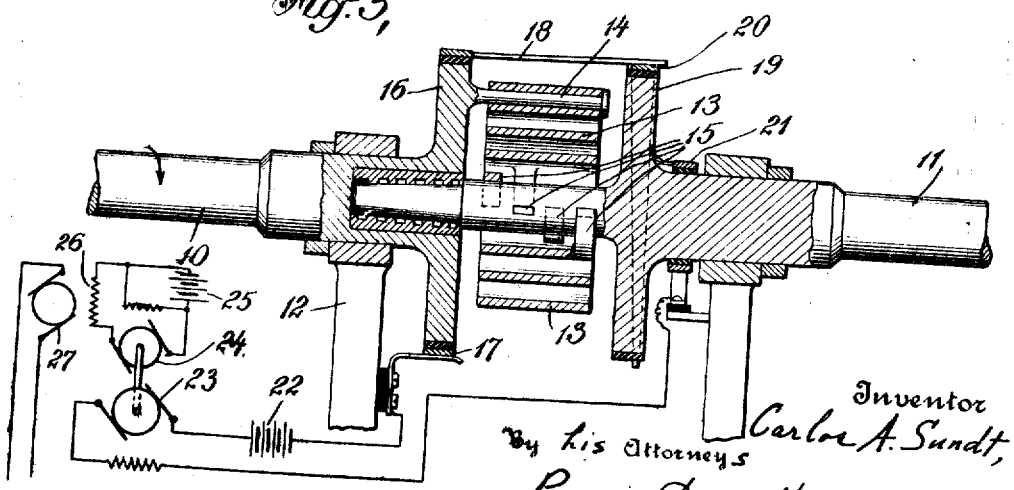
Fig. 3 shows a further modification of governor or regulator adapted for the regulation of engines, motors, etc.

In the construction of Fig. 3, the driving shaft 10 and driven shaft 11 are supported from a common bearing 12, the driven shaft extending into the hollow portion of the driving shaft and being supported therethrough in the manner illustrated. The shafts are connected by the spiral spring or coupling 13 which is connected with the driving shaft by the extension 14 and with the driven shaft by suitable connecting members 15.

Mounted upon the enlarged end 16 of the driving shaft is a conducting ring 17 insulated therefrom and carrying an arm 18. The driven shaft has a similarly enlarged circular portion or disk 19 which rotates therewith and which carries a resistance element 20 insulated therefrom. This resistance element is connected electrically with a ring 21 mounted on the driven and driving shaft and insulated therefrom. Suitable brush connections are provided with this ring and with the conducting ring 17. The arm 18 is arranged to press yieldingly upon the resistance element 20 and the slide thereon with relative rotation of the driving and driven shafts.

Electrically connected with the ring 17 is a source of electric energy 22 of constant voltage. The connection therefrom and the connection from the ring 21 lead to a suitable regulating series motors 23 or device for regulating the driving motor which drives the driving shaft. Any of the well known arrangements adapted for this purpose may be used.

By way of illustration, the regulating motor is here shown connected to a small generator 24 serving as a bucker in circuit with a source of substantially constant voltage, such as a storage battery 25, and the field 26 of the main driving motor, the armature 27 of which is connected to the driving shaft 10 in any appropriate manner.

The arrangements of parts of Fig. 3 is such that when the load increases on the driven shaft, the driving shaft will advance with respect thereto and this relative rotation will cause the arm 18 to slide upon the resistance element 20 and cause a decrease in the resistance thereof. This decreased resistance will act upon the regulating motor 23, to cause its speed to be increased and hence the voltage of the bucker 24 will also be increased, causing the latter to decrease the energizing effect of the battery 25 upon the field 26 of the main driving motor. The counter electromotive force of this motor will thus be decreased causing more current to flow through its armature to take care of the increased load on the driven shaft 11 and cause the latter to be brought up to the same speed as the driving shaft 10. Decreased load with corresponding relative rotation of the driving and driven shafts in the opposite direction will cause a corresponding increase in resistance, due to the resistance element 20 and will cause a corresponding regulation of the main driving motor so that less power will be applied and the desired uniform speed still maintained.

It will be evident that various types of electrical connections are available for connecting the circuit illustrated in Fig. 3 with the main driving motor to bring about regulation thereof; the primary regulating action taking place in the structure illustrated in Fig. 3 by the relative rotation of the driving and driven shafts and by the relative positions of the arm 18 on the resistance element 20.

With the governor or regulator of the present invention, the response to the changes in load will be immediate. The changes in load will cause immediate relative rotation of the driven and driving shafts, because of the elastic and flexible connection therebetween; and this relative rotation will be transmitted, either by mechanical or electrical connections, to the driving engine or motor in the same manner that governing action of common types of governors and regulators is transmitted to the driving engine or motor.

The governor or regulator of the present invention is one of high sensitiveness and one which provides a high degree of regularity so that uniform action under varying loads will be easily obtained.

Having thus described my invention, what I claim is:

1. A governor or regulator for engines, motors, etc., comprising in combination a driving shaft, a driven shaft, a torsion spring having its ends directly connected to said shafts and formed with a number of convolutions surrounding the adjacent ends of the shafts to form a driving connection through which power is transmitted and which permits relative rotation of the driving and driven shafts, and means operated by said relative rotation of the shafts for governing or controlling the driving engine or motor.

2. A governor or regulator for engines, motors, etc., comprising in combination, a driving and a driven shaft with a torsional connection therebetween through which the power is transmitted and which permits relative rotation of the driving and driven shafts, a sleeve on the driven shaft slidable longitudinally thereon but rotated therewith, a sleeve on the driving shaft for causing longitudinal movement of said former sleeve upon relative rotation of the driving and driven shafts, and means operated by said longitudinal movement for effecting the governing or regulating of the driving engine or motor.

3. A governor or regulator for engines, motors, etc., comprising in combination a driving shaft, a driven shaft, a torsion spring directly connecting said shafts through which power is transmitted, a cylindrical member rotatable with the driving shaft and surrounding the spring, a member rotatable with the driven shaft and connected to the end of the cylindrical member on the driving shaft, so that relative rotation of the two shafts produces relative displacement of the members with respect to each other and means whereby the relative displacement effects regulation of the driving engine or motor.

4. A governor or regulator for engines, motors, etc., comprising in combination a driving shaft, a driven shaft, a torsion spring directly connecting said shafts through which power is transmitted, a member rotatable with one shaft, a cylindrical member rotatable with the other shaft and surrounding the spring, the member rotatable with the one shaft being formed with screw threads engaged by corresponding threads of the cylindrical member on the other shaft, so that relative rotation of the driving and driven shafts produces relative displacement of the members with respect to each other, and means whereby the relative displacement effects a regulation of the driving engine or motor.

In testimony whereof I affix my signature.

CARLOS A. SUNDT.